United States Patent [19]
Wu

[11] Patent Number: 5,906,365
[45] Date of Patent: May 25, 1999

[54] CLAMPING DEVICE FOR KEY DUPLICATING MACHINE

[76] Inventor: Kuo-Shen Wu, No. 10, Alley 14, Lane 74, Pa Ta Road, Section 3, Taipei, Taiwan

[21] Appl. No.: 08/786,319

[22] Filed: Jan. 23, 1997

[51] Int. Cl.$^6$ .................................................. B25B 1/20
[52] U.S. Cl. ................................................ 269/43; 269/319
[58] Field of Search .............................. 269/43, 44, 103, 269/134, 110, 160, 243, 315, 303; 409/81, 83, 82; 451/365

[56] References Cited

U.S. PATENT DOCUMENTS

| | | | |
|---|---|---|---|
| 508,732 | 11/1893 | Mason, Jr. | 269/315 |
| 926,470 | 6/1909 | Cosby | 269/91 |
| 2,620,695 | 12/1952 | Eierman | 269/160 |
| 4,531,559 | 7/1985 | Glasgo | 269/87.1 |
| 4,614,465 | 9/1986 | Wu | 409/81 |
| 4,709,511 | 12/1987 | Camillo | 451/365 |
| 4,811,936 | 3/1989 | Laymaster | 269/43 |
| 5,259,708 | 11/1993 | Brice | 409/81 |
| 5,360,299 | 11/1994 | Oliana | 409/83 |
| 5,551,676 | 9/1996 | Tibbet | 269/43 |
| 5,702,096 | 12/1997 | Buck | 269/43 |

*Primary Examiner*—David A. Scherbel
*Assistant Examiner*—Lee Wilson
*Attorney, Agent, or Firm*—Birch, Stewart, Kolasch & Birch, LLP

[57] ABSTRACT

A clamping device for a key duplicating machine includes two pairs of fixed jaws and movable jaws arranged on a base, and can be relatively moved to each other along two horizontal parallel upper and lower guide rods. The fixed and movable jaws are provided with several vertical semi-cylindrical notches of different radii on the confronting sides thereof in order to form several vertical approximate cylindrical clamping holes for clamping cylindrical keys of different diameters when the movable jaws are moved toward the fixed jaws. An upright biasing device is provided on the base beneath a horizontal portion of the fixed and movable jaw. The biasing device includes a pivotable location stopper arranged on the fixed jaw and has a horizontal plate portion arranged in a pre-determined level position. The biasing device further includes an upright cylinder and a compression spring received in the cylinder for upward biasing of a cylindrical key blank or an original key to be clamped against the horizontal plate portion.

4 Claims, 2 Drawing Sheets

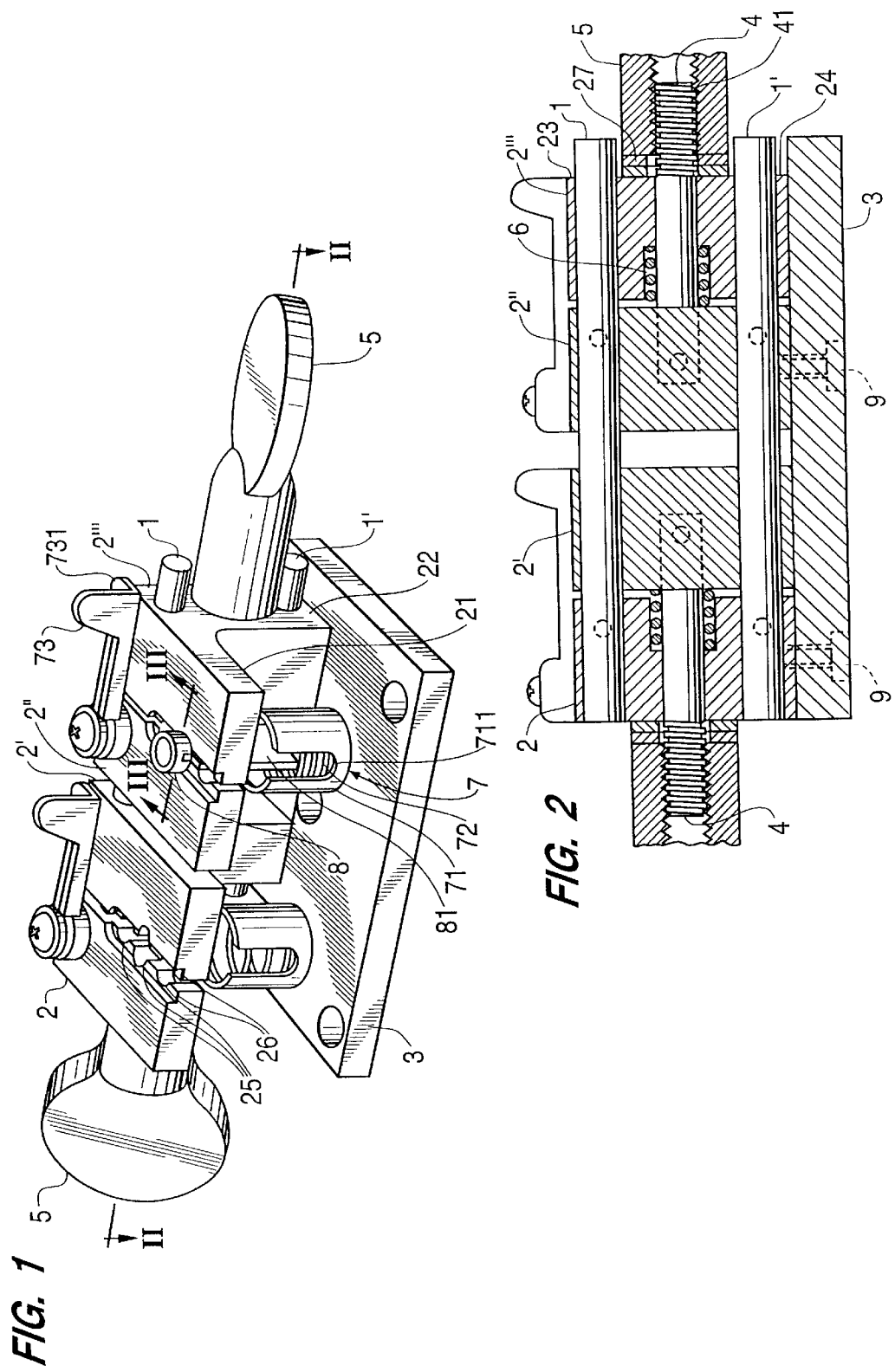

5,906,365

CLAMPING DEVICE FOR KEY DUPLICATING MACHINE

BACKGROUND OF THE INVENTION

The present invention relates to a clamping device for a key duplicating machine for clamping a cylindrical key or a flat key.

Conventional clamping devices for key duplicating machines can only be used to clamp a specific type of key, e.g., a flat key or a cylindrical key.

However, there are several types of keys sold in the market, e.g. flat keys, cylindrical keys, or semi-cylinder keys. Each key has to be duplicated by a key duplicating machine having a specific type of the clamping device. Hence, it is necessary for the lock-smith to have several key duplicating machines with several types of the clamping devices to carry out duplication of different kinds of keys. This will result in an increase of the key duplicating cost.

The present invention aims at eliminating the above disadvantages and provides a clamping device for key duplicating machine for clamping a cylindrical key or a flat key.

In a preferred aspect of the present invention, the clamping device for key duplicating machine comprises two pairs of fixed jaws and movable jaws arranged on a base, and can be relatively moved to each other along two horizontal parallel upper and lower guide rods; the fixed and movable jaws being provided with several vertical semicylindrical notches of different radii on the confronting sides thereof in order to form several vertical approximate cylindrical clamping holes for clamping cylindrical keys of different diameters when the movable jaws are moved toward the fixed jaws; an upright biasing means provided on the base beneath a horizontal portion of the fixed and movable jaws, including a pivotable location stopper arranged on the fixed jaws and having a horizontal plate portion arranged in a pre-determined level position; an upright cylinder; and a compression spring received in the cylinder for upward biasing a cylindrical key blank or original key to be clamped against the horizontal plate portion.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention are given by way of illustration only, since various changes and modifications within the spirit and scope of the invention will become apparent to those skilled in the art from this detailed description.

DESCRIPTION OF THE DRAWING

The present invention will become more fully understood from the detailed description given hereinbelow and the accompanying drawings which are given by way of illustration only, and thus are not limitative of the present invention, and wherein:

FIG. 1 is a perspective view of an embodiment of a pair of clamping devices for a key duplicating machine in accordance with the present invention in which a cylindrical key is clamped by one of the clamping devices.

FIG. 2 is a cross sectional view taken along line II—II of FIG. 1;

DETAILED DESCRIPTION OF THE INVENTION

Figure 3:
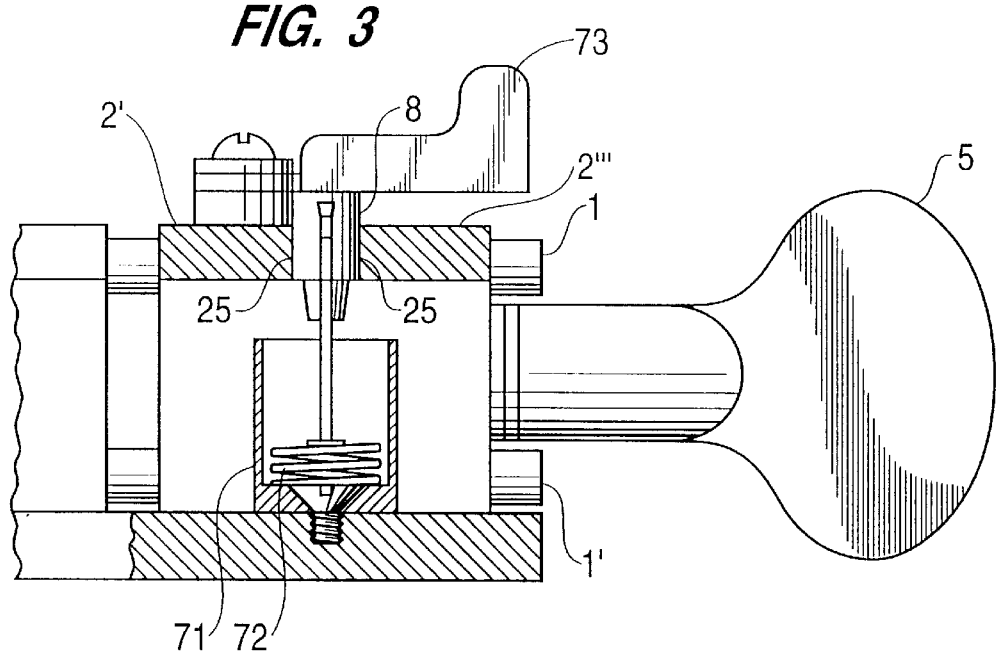
FIG. 3 is a cross sectional view taken along line III—III of FIG. 1.
Figure 4:
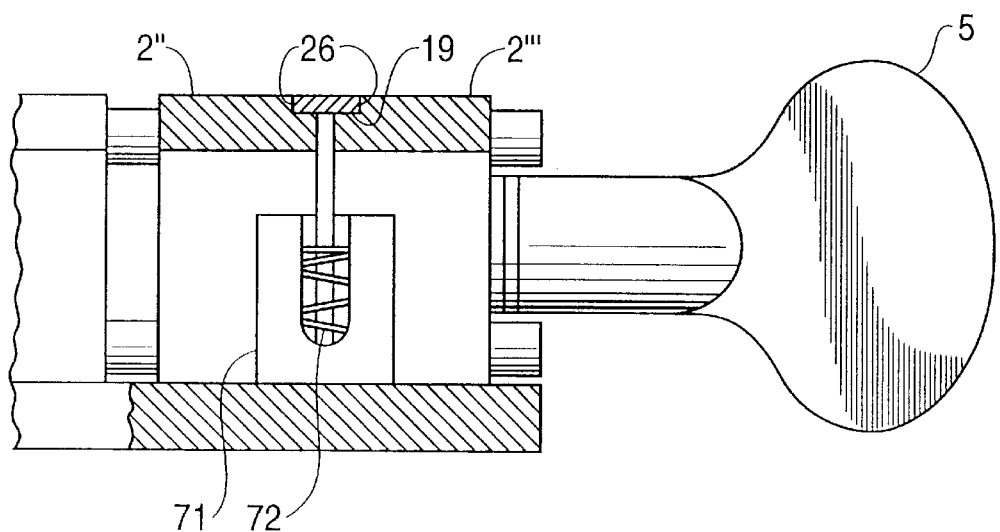
FIG. 4 is a view similar to FIG. 3 but showing a flat key clamped by the clamping device.

Referring to FIG. 1, a clamping device for a key duplicating machine for clamping a cylindrical key or a flat key which is an embodiment of the present invention comprises two pairs of jaws 2, 2', 2" and 2'" arranged on a base 3 and having a horizontal portion 21 and a vertical portion 22 provided with two upper and lower holes 23 and 24 for engagement with two horizontal parallel upper and lower guide rods 1 and 1 in order to form a pair of clamping devices in which each pair of the jaws 2,2', 2" and 2'" can be relatively moved smoothly along two horizontal parallel upper and lower guide rods 1 and 1'. As shown in FIG. 2, jaws 2 and 2" are fixed jaws fixed on the top of the base 3 by the screw 9, while jaws 2' and 2'" are movable jaws. A bolt 4 is horizontally fixed onto the fixed jaw 2 or 2" between two parallel upper and lower guide rods 1 and 1, and has a thread portion 41 formed on the end thereof for passing through a hole 27 formed on the movable jaw 2' or 2'" and threadedly engaging a grip 5 in order to drive the movable jaw toward the fixed jaw for clamping keys by turning of the grip 5 in a clockwise direction.

Referring now to FIG. 1 again, each pair of the fixed and movable jaws is provided with several (e.g. three in this embodiment) longitudinal semicylindrical notches 25 of different radii on the confronting sides thereof in order to form several longitudinal approximate cylindrical clamping holes when they are relatively moved close to each other for vertically clamping cylindrical keys 8 of different diameters.

In order to move the movable jaws away from the fixed jaws by turning grip 5 in a counter-clockwise direction, a compression spring 6 is received in a hole and biased between the movable and fixed jaws in order to push the movable jaw to an open position by means of the stored energy of the compression spring. Hence, when the grip 5 is turned in a clockwise direction, the movable jaw will be moved close to the fixed jaw to a clamping position and the compression spring 6 is compressed, in order to clamp the keys for carrying out key duplicating work. After the key duplicating work is finished and when the clamping device is to be opened, the grip 5 is turned in a counter-clockwise direction, and the movable jaw will be driven to an open position by means of the stored energy of the compression spring 6.

An upright biasing means 7 is provided on the base 3 beneath a horizontal portion 21 of the fixed and movable jaws, which comprises a longitudinal cylinder 71, a compression spring 72 received in the cylinder 71, and a pivotable location stopper 73 arranged above the fixed jaw. Two longitudinal slits 711 are diametrically provided on the wall of the cylinder 71 for receiving and locating the grip portion of the key. The pivotable location stopper 73 is formed in a L-shape and horizontally pivotably secured on the top of the fixed jaw, which has a horizontal plate portion 731 arranged in a pre-determined level position. When the cylindrical key blank or the original key is to be clamped on the clamping device, the grip portion 81 of the cylindrical key blank or the original key is pushed downward against the compression spring 72 received in the cylinder 71 with one hand (e.g. left hand), and the location stopper 73 is turned to a position just below the key blank or the original key with the other hand, and the key blank or the original key will be biased against the horizontal plate portion 731 of the location stopper 73 by means of the force exerted by the compression spring. At this time, the grip 5 of the clamping device is then turned in a clockwise direction in order to drive the movable jaw to clamp the key blank or the original key 8 for carrying out the key duplicating work.

The fixed and movable jaws are provided with a cross-sectional horizontal L-shaped notch 26 at the upper end of the confronting sides thereof in order to form two rectangular grooves when they are moved relatively close to each other for clamping flat keys 19.

I claim:

1. A clamping device for a key duplicating machine for clamping at least one of a cylindrical key and a flat key, said clamping device comprising one pair of fixed jaws and one pair of moveable jaws arranged on a base, each moveable jaw being moveable relative to a respective fixed jaw along two horizontal parallel upper and lower guide rods, said fixed and moveable jaws being provided with several vertical semicylindrical notches of different radii on confronting sides thereof in order to form several vertical approximate cylindrical clamping holes for clamping cylindrical keys of different diameters when said moveable jaws are moved toward said fixed jaws; and an upright biasing means provided on said base beneath a horizontal portion of each pair of fixed and moveable jaws, said biasing means including a pivotable location stopper arranged on each fixed jaw and each stopper having a horizontal plate portion arranged in a predetermined level position, said biasing means further including an upright cylinder and a compression spring received in said cylinder for upward biasing of a cylindrical key blank or original key to be clamped against a respective horizontal plate portion of a respective stopper.

2. The clamping device as claimed in claim 1, wherein each pivotable location stopper is L-shaped in order to form a respective horizontal plate portion and pivotably secured on a top portion of a respective fixed jaw.

3. The clamping device as claimed in claim 1, wherein said fixed and movable jaws are provided with a confronting horizontal L-shaped notch at an upper end of the confronting sides thereof in order to form a rectangular groove when said movable jaws are moved toward respective fixed jaws for clamping a flat key.

4. The clamping device as claimed in claim 1, wherein each cylinder is provided with two confronting longitudinal slits for receiving and locating a grip portion of a cylindrical key.

\* \* \* \* \*